(12) United States Patent
Tojigamori et al.

(10) Patent No.: US 9,160,000 B2
(45) Date of Patent: Oct. 13, 2015

(54) ACTIVE MATERIAL FOR BATTERY, AND BATTERY

(75) Inventors: Takeshi Tojigamori, Susono (JP); Hideki Oki, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 406 days.

(21) Appl. No.: 13/636,211

(22) PCT Filed: Feb. 18, 2011

(86) PCT No.: PCT/JP2011/053502
§ 371 (c)(1),
(2), (4) Date: Sep. 25, 2012

(87) PCT Pub. No.: WO2011/118302
PCT Pub. Date: Sep. 29, 2011

(65) Prior Publication Data
US 2013/0022875 A1    Jan. 24, 2013

(30) Foreign Application Priority Data
Mar. 25, 2010   (WO) .................. PCT/JP2010/055197

(51) Int. Cl.
*H01M 4/131* (2010.01)
*C01F 17/00* (2006.01)
*C01B 17/00* (2006.01)
*H01M 4/58* (2010.01)
*H01M 10/052* (2010.01)

(52) U.S. Cl.
CPC ............ *H01M 4/581* (2013.01); *H01M 4/5815* (2013.01); *H01M 10/052* (2013.01); *Y02E 60/122* (2013.01); *Y02T 10/7011* (2013.01)

(58) Field of Classification Search
CPC .. H01M 4/581; H01M 4/5815; H01M 10/052
USPC ................................ 429/231.5; 423/263, 518
See application file for complete search history.

(56) References Cited

U.S. PATENT DOCUMENTS

2006/0199078 A1* 9/2006 Koshina ................... 429/231.95
2008/0113264 A1   5/2008 Inagaki et al.
2008/0145758 A1   6/2008 Kim et al.

FOREIGN PATENT DOCUMENTS

JP   A-2001-283845   10/2001
JP   A-2004-079463   3/2004
JP   A-2006-127911   5/2006

(Continued)

OTHER PUBLICATIONS

Clarke, Hayward, et al. "The Cation-Deficient Ruddlesden-Popper Oxysulfide Y2Ti2O5S2 as a Layered Sulfide: Topotactic Potassium Intercalation to Form K Y2Ti2O5S2." Inorganic Chemistry vol. 42, No. 24 (2003) 7906-7911.*

(Continued)

*Primary Examiner* — Milton I Cano
*Assistant Examiner* — Michael Dignan
(74) *Attorney, Agent, or Firm* — Oliff PLC (57) ABSTRACT

An active material for a battery, which has high thermal stability and low electric potential. According to the invention, an active material for a battery including an M element in Group III, a Ti element, an O element, and an S element and having an $M_2Ti_2O_5S_2$ crystalline phase is provided to solve the problem.

15 Claims, 4 Drawing Sheets

(56) References Cited

FOREIGN PATENT DOCUMENTS

| | | |
|---|---|---|
| JP | A-2008-123787 | 5/2008 |
| JP | A-2008-130560 | 6/2008 |

OTHER PUBLICATIONS

"Two alternative products from the intercalation of alkali metals into cation-defective Ruddlesden-Popper oxysulfides." Chem. Commun. (2001) 2356-2357 by Clarke et al. available Oct. 2001.*

"Electrochemical performance and local cationic distribution in layered $LiNi1/2Mn1/2O2$ electrodes for lithium ion batteries." Electrochimica Acta 54 (2009) 1694-1701 by Yoncheva et al. available Oct. 2008.*

Christine Boyer et al. "Synthesis and structure determination of the new $Sm_2Ti_2O_5S_2$ compound," Solid State Chemistry and Crystal Chemistry, vol. 2, No. 2, pp. 93-99, 1999.

Sylvio Indris et al. "Layered Oxysulfides as Insertion Hosts for Li-Ion Batteries," C.P.J Amer. Chem. Soc., vol. 128,13354, 2006.

Goga et al., "$Ln_2Ti_2S_2O_5$ (Ln=Nd, Pr, Sm): a novel series of defective Ruddlesden-Popper Phases," *Chem. Commun.*, pp. 979-980, 1999.

Hyett et al., "Electronically Driven Structural Distortions in Lithium Intercalates of the n=2 Ruddlesden-Popper-Type Host $Y_2Ti_2O_5S_2$: Synthesis, Structure, and Properties of $Li_xY_2Ti_2O_5S_2$ (0<x<2)," *J. Am. Chem, Soc.*, vol. 126, No. 7, pp. 1980-1991, 2004.

International Search Report issued in Application No. PCT/JP2011/053502; Dated May 24, 2011 (With Translation).

* cited by examiner

ACTIVE MATERIAL FOR BATTERY, AND BATTERY

TECHNICAL FIELD

The present invention relates to an active material for a battery, which is useful as an anode active material of a lithium battery, for example, and a battery using the same.

BACKGROUND ART

As having high electromotive force and high energy density, a lithium battery is widely used in a field of an information technology equipment and a communication device. Meanwhile, in an automotive field, there is a strong need for development of an electric vehicle or a hybrid vehicle due to an environmental problem and a resource problem. In this regard, a lithium battery is also considered as a power source for them. The lithium battery generally comprises a cathode active material layer which contains a cathode active material, an anode active material layer which contains an anode active material, and an electrolyte layer that is formed between the cathode active material layer and the anode active material layer.

Conventionally, carbon materials (for example, graphite) are used as an anode active material of a lithium battery. Meanwhile, to further improve safety, an active material with higher thermal stability is required. In this regard, a non-aqueous electrolyte battery in which lithium titanate (LTO) is used as an anode active material is disclosed in Patent Literature 1. Since LTO is an oxide, it has high thermal stability, and thus it is advantageous in terms of safety.

However, Li insertion and extraction electric potential of LTO (oxidation and reduction electric potential) relative to Li metal is about 1.5 V, which is higher than conventional carbon materials (about 0.3 V). Thus, battery voltage of a battery using it is low. Since the battery voltage can be defined by a difference between Li insertion and extraction electric potential of a cathode active material and Li insertion and extraction electric potential of an anode active material, for example, there is a problem that the battery voltage is lowered when Li insertion and extraction electric potential of an anode active material is increased under the condition in which the same cathode active material is used.

In Non Patent Literature 1, evaluation of the physical properties of $Li_xY_2Ti_2O_5S_2$ is disclosed. However, according to the literature, only the evaluation of physical properties of $Li_xY_2Ti_2O_5S_2$ is made and absolutely no evaluation is made on characteristics of a battery. Further, according to Non Patent Literature 1, as a method of synthesizing $Li_xY_2Ti_2O_5S_2$, Li is forced to be incorporated to $Y_2Ti_2O_5S_2$. However, there is no description suggesting that the Li may be extracted, and naturally no description suggesting that it may function as an active material is included therein. In Non Patent Literature 2, evaluation of the physical properties of $Nd_2Ti_2O_5S_2$ is disclosed. However, according to the literature, only the evaluation of physical properties of $Nd_2Ti_2O_5S_2$ is made and absolutely no evaluation is made on characteristics of a battery.

CITATION LIST

Patent Literature

Patent Literature 1: Japanese Patent Application Laid-Open No. 2008-123787

Non Patent Literature

Non Patent Literature 1: Geoffrey Hyett et al., "Electronically Driven Structural Distortions in Lithium Intercalates of the n=2 Ruddlesden-Popper Type Host $Y_2Ti_2O_5S_2$: Synthesis, Structure, and Properties of $Li_xY_2Ti_2O_5S_2$ (0<x<2)", Journal of the American Chemical Society, 126, 1980-1991 (2004).

Non Patent Literature 2: M. Goga et al., "$Ln_2Ti_2S_2O_5$ (Ln=Nd, Pr, Sm): a novel series of defective Ruddlesden-Popper phases", Chemical communications, 1999, 979-980

SUMMARY OF INVENTION

Technical Problem

The present invention is devised in view of the problems described above, and an object of the invention is to provide an active material for a battery which has high thermal stability and low electric potential.

Solution to Problem

To achieve the object of the invention, the invention provides an active material for a battery, comprising a M element in Group III, a Ti element, an O element, and a S element and having an $M_2Ti_2O_5S_2$ crystalline phase.

According to the invention, as the active material has an $M_2Ti_2O_5S_2$ crystalline phase, it can be provided as an active material for a battery having a low electric potential. For such reasons, the active material for a battery of the invention is useful as an anode active material, for example. Further, since the active material for a battery of the invention contains the O element and shows a behavior of an oxide, it is advantageous in that the thermal stability is better than conventional carbon materials.

According to the above invention, it is preferable that the active material for a battery contains the $M_2Ti_2O_5S_2$ crystalline phase as a main component, because it can be provided as an active material for a battery having lower electric potential.

According to the above invention, it is preferable that the M element is at least one of Y and Nd.

According to the above invention, it is preferable that the Li insertion and extraction electric potential relative to Li metal is 1.4 V or less, because the battery voltage can be increased for a case in which the active material for a battery of the invention is used as an anode active material of a lithium battery compared to a case in which a conventional LTO (Li insertion and extraction electric potential: 1.5 V) is used as an anode active material.

Further, according to the invention, an active material for a battery comprises a M element in Group III, a Ti element, an O element, and a S element, has a crystalline phase, and has Li insertion and extraction electric potential relative to Li metal of 1.4 V or less.

According to the invention, since the Li insertion and extraction electric potential relative to Li metal is the same or less than a predetermined value, it is possible to provide an active material for a battery having a low electric potential. Further, since the active material for a battery of the invention contains an O element and shows an behavior of an oxide, it is advantageous in that thermal stability is better than conventional carbon materials.

According to the above invention, it is preferable to have a crystalline phase with the structure in which a part of the M element, that is present at site A of Ruddlesden-Popper structure $A_3B_2C_7$, is defective, because an active material for a battery having even a lower electric potential can be provided.

According to the above invention, it is preferable that the M element is at least one of Y and Nd.

According to the above invention, it is preferable that the active material for a battery is an anode active material. For example, when the active material for a battery of the invention is used as an anode active material of a lithium battery, the battery voltage can be increased compared to a case in which conventional LTO is used as an anode active material.

Further, according to the invention, a battery comprising: a cathode active material layer containing a cathode active material, an anode active material layer containing an anode active material, and an electrolyte layer formed between the cathode active material layer and the anode active material layer, characterized in that the cathode active material or the anode active material is the active material for the battery described above is provided.

According to the invention, by using an active material for a battery which has excellent thermal stability, a battery with excellent safety can be provided. In particular, when the active material for a battery is contained in an anode active material layer, a battery with high battery voltage can be provided.

According to the above invention, it is preferable that the anode active material is the active material for a battery describe above. For example, when the battery of the invention is a lithium battery, the battery voltage can be increased compared to a case in which a conventional LTO is used as an anode active material.

According to the above invention, it is preferable that the M element is Y (yttrium) and the cathode active material is an active material which has a Li insertion and extraction electric potential relative to Li metal in the range of 4.6 V to 4.8 V. The reasons is that, by using the cathode active material in combination with the active material for a battery (anode active material) in which the M element is Y (yttrium), a battery having the battery voltage of 3.4 V to 3.7 V can be easily obtained.

According to the above invention, it is preferable that the difference between the Li insertion and extraction electric potential relative to Li metal of the cathode active material and the Li insertion and extraction electric potential relative to Li metal of the anode active material and is within the range of 3.4 V to 3.7 V. The reason is that the battery of the invention can be applied without a change of design to a device which is widely used at present (that is, a device requiring a battery with battery voltage of 3.6 V).

According to the above invention, it is preferable that the battery is a lithium battery, because a battery with high battery voltage can be provided.

Advantageous Effects of Invention

According to the invention, the effect of providing an active material for a battery which has high thermal stability and low electric potential can be obtained.

DESCRIPTION OF EMBODIMENTS

Herein below, the active material for a battery and the battery of the invention are explained in detail.

A. Active Material for Battery

First, an active material for a battery according to the present invention will be described. The active material for a battery according to the present invention can be roughly divided into two embodiments. The active material for a battery according to the present invention will be described below with reference to a first embodiment and a second embodiment.

1. First Embodiment

A first embodiment of an active material for a battery according to the present invention will be described. The active material for a battery according to the first embodiment comprises a M element in Group III, a Ti element, an O element, and a S element, and has an $M_2Ti_2O_5S_2$ crystalline phase.

Since the active material for a battery according to the embodiment contains a $M_2Ti_2O_5S_2$ crystalline phase, an active material with a low electric potential can be provided. Therefore, the active material for a battery according to the embodiment is useful as, for example, an anode active material. Further, the active material for a battery according to the embodiment contains an O element, and therefore behaves as an oxide, which is advantageous in that its thermal stability is higher than that of a carbon material conventionally used.

The active material for a battery according to the embodiment contains a $M_2Ti_2O_5S_2$ crystalline phase. The presence of a $M_2Ti_2O_5S_2$ crystalline phase can be checked by, for example, X ray diffraction (XRD). Further, it is considered that a crystalline phase of $M_2Ti_2O_5S_2$ corresponds to a crystalline phase having a defective Ruddlesden-Popper structure. In general, a Ruddlesden-Popper structure has composition represented by the general formula $A_{n+1}B_nC_{3n+1}$ ("n" is an integer), and has a layered structure of alternating perovskite and rock-salt structures. Here, in a case where "n" is 2, the above-mentioned general formula can be expressed as $A_3B_2C_7$. When comparison is made between $A_3B_2C_7$ and $M_2Ti_2O_5S_2$ according to the embodiment, M is present at the A site, Ti is present at the B site, and O and S are present at the C site. When having three M atoms at the A site, it may correspond to a non-defective Ruddlesden-Popper structure. However, since the active material for a battery according to the embodiment has only two M atoms, the A site is defective and a metal ion (for example, Li ion) is inserted/extracted into/from the defective site. Thus, it is considered that this is the reason why $M_2Ti_2O_5S_2$ exhibits a remarkable function as an active material. Further, it is considered that a $M_2Ti_2O_5S_2$ crystalline phase reacts with a metal ion (for example, Li ion) in the following manner and the $M_2Ti_2O_5S_2$ crystalline phase functions as a so-called insertion and extraction type active material.

$$M_2Ti_2O_5S_2 + xLi^+ + xe^- \Leftrightarrow Li_xM_2Ti_2O_5S_2$$

The M element according to the embodiment is generally a trivalent Group III element, and it includes Sc, Y, lanthanoids and actinoids. Of these, the M element is preferably at least one selected from a group consisting of Y, Nd, Sc, Pr, Sm, Gd, Tb, Dy, and Er, and more preferably at least one selected from a group consisting of Y, Nd, and Sc.

The active material for a battery according to the embodiment preferably contains a high proportion of $M_2Ti_2O_5S_2$ crystalline phase. Specifically, the active material for a battery according to the embodiment preferably contains a $M_2Ti_2O_5S_2$ crystalline phase as a main component. This is because such an active material for a battery can have a lower electric potential. The expression " . . . contains a $M_2Ti_2O_5S_2$ crystalline phase as a main component" as used herein means that the proportion of a $M_2Ti_2O_5S_2$ crystalline phase contained in the active material for a battery is higher than those of other crystalline phases contained in the active material for a battery. The proportion of a $M_2Ti_2O_5S_2$ crystalline phase contained in the active material for a battery is preferably 50 mol % or higher, more preferably 60 mol % or higher, and even more preferably 70 mol % or higher. The active material for a battery according to the embodiment may be one composed of only a $M_2Ti_2O_5S_2$ crystalline phase (that is, a single-phase active material). It is to be noted that the proportion of a $M_2Ti_2O_5S_2$ crystalline phase contained in the active material for a battery can be determined by, for example, producing a battery having Li metal as a counter electrode and measuring the capacity of the battery. For example, when the M element is Y (yttrium), the capacity at 0.8 V to 1.5 V relative to Li metal corresponds to the reaction of insertion and extraction of Li into/from $Y_2Ti_2O_5S_2$.

The Li insertion and extraction electric potential relative to Li metal of the active material for a battery according to the embodiment is preferably 1.5 V or less, more preferably 1.4 V or less, even more preferably 1.3 V or less, and particularly preferably 1.2 V or less. This is because when the active material for a battery according to the embodiment is used as an anode active material of a lithium battery, the lithium battery can have the same or higher voltage as compared to a case in which a conventional LTO (Li insertion and extraction electric potential: 1.5 V) is used as an anode active material. Meanwhile, the Li insertion and extraction electric potential relative to Li metal of the active material for a battery according to the embodiment is preferably 0.5 V or higher. In the embodiment, the Li insertion and extraction electric potential of the active material for a battery can be defined as an average of the Li insertion electric potential and the Li extraction electric potential. Further, the Li insertion electric potential and the Li extraction electric potential can be determined by a cyclic voltammetry (CV) method.

The active material for a battery according to the embodiment may be used as either a cathode active material or an anode active material, but is preferably used as the latter. This is because when the active material for a battery according to the embodiment is used as, for example, an anode active material of a lithium battery, the lithium battery can have a higher voltage as compared to a case in which a conventional LTO is used as an anode active material.

Further, the electron conductivity of the active material for a battery according to the embodiment tends to be improved as the proportion of a $M_2Ti_2O_5S_2$ crystalline phase contained in the active material for a battery is increased. When the active material itself has high electron conductivity, the amount of a conductivity-imparting agent to be used can be reduced, thereby making it possible to increase the amount of the active material used. This is advantageous in that a resultant battery can have higher capacity. The electron conductivity (at room temperature) of the active material for a battery according to the embodiment is preferably, for example, $10^{-7}$ S/cm or higher, and more preferably $10^{-5}$ S/cm or higher.

The active material for a battery according to the embodiment preferably has a granular shape. The average particle diameter of the active material for a battery is preferably in the range of, for example, 1 nm to 100 μm, and particularly preferably in the range of 10 nm to 30 μm.

The active material for a battery according to the embodiment allows insertion and extraction of a metal (metal ion), so that it may be used as an active material of various batteries. Examples of the battery include a lithium battery, a sodium battery, a magnesium battery, and a calcium battery. Of these, a lithium battery and a sodium battery are preferable. A lithium battery is particularly preferable. Further, the active material for a battery according to the embodiment may be an active material used for a primary battery or an active material used for a secondary battery. The latter is preferable. The reason is that, as being capable of having repeated charge and discharge, it is useful as an active material for an automotive battery, for example.

The method for producing an active material for a battery according to the embodiment is not specifically limited if the above-described active material for a battery can be obtained by the method. Example of the method for producing the active material for a battery according to the embodiment includes a solid phase method. Specific examples of the solid phase method include a method by which $M_2O_3$ (for example, $Y_2O_3$ and $Nd_2O_3$), $TiO_2$, and $TiS_2$ are admixed with each other at a ratio which allows obtainment of $M_2Ti_2O_5S_2$ in a crystalline phase and the mixture is heated. To inhibit any unnecessary side reaction, it is preferable to carry out the heating under vacuum state. Further, when $M_2O_3$, $TiO_2$, and $TiS_2$ are admixed with each other in equimolar amount, composition of $M_2Ti_2O_5S_2$ can be obtained stoichiometrically. Further, since the active material for a battery according to the embodiment contains an S element, deterioration caused by reaction with moisture in air needs to be considered. Thus, storing the active material for a battery and producing a battery using the active material for a battery are preferably carried out under an inert gas atmosphere.

2. Second Embodiment

Next, a second embodiment of an active material for a battery according to the present invention will be described. The active material for a battery according to the second embodiment comprises a M element in Group III, a Ti element, an O element, and a S element, has a crystalline phase, and the Li insertion and extraction electric potential relative to Li metal is 1.4 V or less.

According to the second embodiment, Li insertion and extraction electric potential relative to Li metal is the same or less than a predetermined value, and therefore an active material for a battery with a low electric potential can be provided. Therefore, the active material for a battery according to the second embodiment is useful as, for example, an anode active material. Further, when the active material for a battery according to the second embodiment is used as an anode active material of a lithium battery, the Li insertion and extraction electric potential can be lowered than a conventional LTO, and thus a lithium battery with a higher battery voltage than a conventional battery can be obtained. Further, since the active material for a battery according to the second embodiment contains an O element and behaves as an oxide, and therefore it is advantageous in that its thermal stability is higher than that of a carbon material conventionally used.

The active material for a battery according to the embodiment is characterized in that the Li insertion and extraction electric potential relative to Li metal is generally the same or less than 1.4 V. However, preferred range and method for measuring the Li insertion and extraction electric potential are the same as those described for the above section "1. First Embodiment."

Further, the active material for a battery according to the embodiment preferably has a crystalline phase in which a part of the M element, which is located at the A site of Ruddlesden-Popper structure $A_3B_2C_7$, are defective, because it is considered that, according to insertion and extraction of metal ions (for example, Li ion) in a defective site, function as an active material is significantly exhibited. In particular, it is preferable that the active material for a battery of the embodiment contains the crystalline phase as a main component.

Further, physical properties, production method, and other factors for the active material for a battery of the embodiment are the same as those described for the above section "1. First Embodiment", and therefore no further descriptions are given herein.

B. Battery

Herein below, the battery of the invention will be explained. The battery of the invention comprises a cathode active material layer containing a cathode active material, an anode active material layer containing an anode active material, and an electrolyte layer formed between the cathode active material layer and the anode active material layer, and it is characterized in that the cathode active material or the anode active material is the active material for a battery described above.

Figure 1:
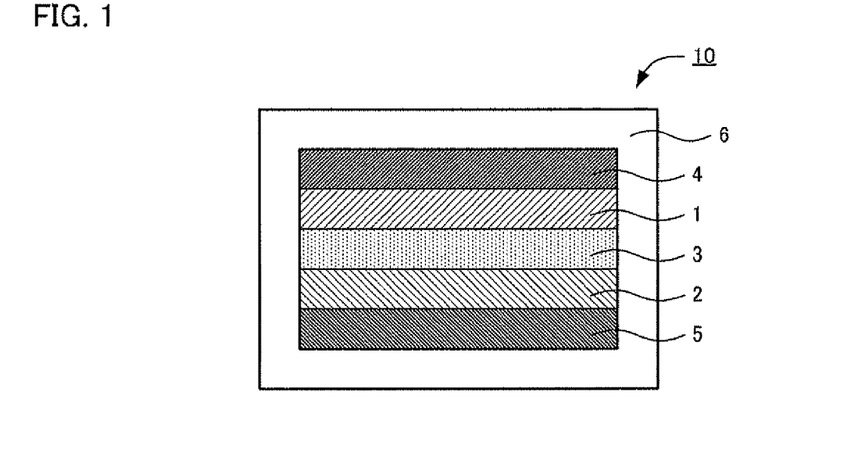
FIG. 1 is a schematic cross-sectional view of one example of the battery of the invention.

FIG. 1 is a schematic sectional view illustrating one example of the battery of the invention. A battery 10 illustrated in FIG. 1 comprises: a cathode active material layer 1, an anode active material layer 2, an electrolyte layer 3 that is formed between the cathode active material layer 1 and the anode active material layer 2, a cathode current collector 4 for collecting current from the cathode active material layer 1, an anode current collector 5 for collecting current from the anode active material layer 2, and a battery case 6 for holding those members. The battery of the invention is remarkably characterized in that the cathode active material layer 1 or the anode active material layer 2 contains the active material for a battery that is described in the above section "A. Active material for battery."

According to the invention, by using an active material for a battery having excellent thermal stability, a battery with excellent safety can be provided. Further, particularly, when an anode active material layer contains the active material for a battery, a battery with a high battery voltage can be provided.

Herein below, the constitution of the battery of the invention will be explained.

1. Anode Active Material Layer

First, the anode active material layer used in the present invention will be described. The anode active material layer used in the present invention is a layer which contains at least an anode active material. Further, the anode active material layer may contain, in addition to the anode active material, at least one of a conducting material, a binding agent, and a solid electrolyte material. Particularly, when the battery according to the present invention is a solid battery having a solid electrolyte layer, the anode active material layer preferably contains a solid electrolyte material. This is because the solid electrolyte layer is less likely to penetrate into the anode active material layer as compared to a liquid electrolyte layer (liquid electrolyte), and therefore there is a possibility that the inside of the anode active material layer has a low ion conductivity. The ion conductivity of the anode active material layer can be easily improved by adding a solid electrolyte material.

In the present invention, the anode active material is preferably the active material for a battery that is described above in "A. Active material for battery." This is because, for example, when the battery according to the present invention is a lithium battery, the lithium battery can have a higher battery voltage than a battery using a conventional LTO as an anode active material. Meanwhile, in the present invention, the above-described active material for a battery may be used as the cathode active material while a conventional active material may be used as the anode active material. In this case, the anode active material needs to be an active material whose electric potential is lower than that of the above-described active material for a battery. Further, the above-described active material for a battery does not contain a metal element (for example, a Li element) that can form conductive ions, and therefore the anode active material preferably contains such a metal element. Particularly, when the battery according to the present invention is a lithium battery and contains the above-described active material for a battery as the cathode active material, a lithium-containing active material such as Li metal or a Li alloy is preferably used as the anode active material.

The material of the conducting material is not particularly limited as long as it has desired electron conductivity. Examples of such a material include carbon materials. Further, specific examples of the carbon materials include acetylene black, ketjen black, carbon black, cokes, carbon fibers, and graphite. Further, the material of the binding agent is not particularly limited as long as it is chemically and electrically stable. Examples of such a material include fluorine-based binding agents such as polyvinylidene fluoride (PVDF) and polytetrafluoroethylene (PTFE) and rubber-based binding agents such as styrene-butadiene rubbers. Further, the solid electrolyte material is not particularly limited as long as it has desired ion conductivity. Examples of such a solid electrolyte material include oxide solid electrolyte materials and sulfide solid electrolyte materials. It is to be noted that the solid electrolyte material will be described in detail later in "3. Electrolyte layer."

The amount of the anode active material contained in the anode active material layer is preferably as large as possible from the viewpoint of capacity. Specifically, the amount of the anode active material contained in the anode active material layer is in the range of 60% by weight to 99% by weight, and preferably in the range of 70% by weight to 95% by weight. Further, the amount of the conducting material contained in the anode active material layer is preferably as small as possible so long as desired electron conductivity can be achieved, and is preferably in the range of, for example, 1% by weight to 30% by weight. Further, the amount of the binding agent contained in the anode active material layer is preferably as small as possible so long as the anode active material or the like can be stably fixed, and is preferably in the range of, for example, 1% by weight to 30% by weight. The amount of the solid electrolyte material contained in the anode active material layer is preferably as small as possible so long as desired ion conductivity can be achieved, and is preferably in the range of, for example, 1% by weight to 40% by weight.

Further, the thickness of the anode active material layer widely varies depending on the configuration of the battery, but is preferably in the range of, for example, 0.1 μm to 1000 μm.

2. Cathode Active Material Layer

Herein below, the cathode active material layer used in the present invention will be described. The cathode active material layer used in the present invention contains at least a cathode active material. Further, the cathode active material layer may contain, in addition to the cathode active material, at least one of a conducting material, a binding agent, and a solid electrolyte material. Particularly, when the battery according to the present invention is a solid battery having a solid electrolyte layer, the cathode active material layer preferably contains a solid electrolyte material. This is because the solid electrolyte layer is less likely to penetrate into the cathode active material layer as compared to a liquid electrolyte layer (liquid electrolyte), and therefore there is a possibility that the inside of the cathode active material layer has a low ion conductivity. The ion conductivity of the cathode active material layer can be easily improved by adding a solid electrolyte material.

In the present invention, the cathode active material is preferably an active material whose electric potential is higher than that of the above-described active material for a battery. That is, the above-described active material for a battery is preferably used not as the cathode active material but as the anode active material. This is because, for example, when the battery according to the present invention is a lithium battery, the lithium battery can have a higher battery voltage than a battery using a conventional LTO as an anode active material.

When the above-described active material for a battery is used as the anode active material, a common active material can be used as the cathode active material. For example, when the battery according to the present invention is a lithium battery, examples of such a cathode active material include: layered cathode active materials such as $LiCoO_2$, $LiNiO_2$, $LiCo_{1/3}Ni_{1/3}Mn_{1/3}O_2$, $LiVO_2$, and $LiCrO_2$; spinel type cathode active materials such as $LiMn_2O_4$, $Li(Ni_{0.25}Mn_{0.75})_2O_4$, and $LiCoMnO_4$, and $Li_2NiMn_3O_8$; and olivine type cathode active materials such as $LiCoPO_4$, $LiMnPO_4$, and $LiFePO_4$.

Further, the cathode active material used in the present invention is preferably an active material whose Li insertion and extraction electric potential relative to Li metal is 4.5 V or more, and more preferably an active material whose Li insertion and extraction electric potential relative to Li metal is in the range of 4.6V to 4.8 V. This is because a battery having a battery voltage of 3.4 V to 3.7 V can be easily obtained by using such a cathode active material in combination with the above-described active material for a battery (anode active material) in which the M element is Y (yttrium). The reason why such a battery voltage is preferred will be described later. Further, the Li insertion and extraction electric potential of the cathode active material relative to Li metal can be calculated by the same method as described above in "A. Active material for battery."

Further, the cathode active material used in the present invention is preferably an active material (Mn-containing active material) containing at least a Li element, a Mn element, and an O element. In this case, the active material further contains preferably at least one element selected from the group consisting of a Ni element, a Cr element, a Fe element, a Cu element, and a Co element, preferably at least one element selected from the group consisting of a Ni element, a Cr element, a Fe element, and a Cu element, and particularly preferably a Ni element. Further, the cathode active material is preferably a spinel type active material. This is because the cathode active material can have a high Li insertion and extraction electric potential relative to Li metal. Examples of such a cathode active material include $LiMn_2O_4$ (4.0 V), $Li(Ni_{0.25}Mn_{0.75})_2O_4$ (4.7 V), $LiCoMnO_4$ (5.0 V), $Li_2FeMn_3O_8$ (4.9 V), $Li_2CuMn_3O_8$ (4.9 V), and $Li_2CrMn_3O_8$ (4.8 V). It is to be noted that the above electric potentials represent Li insertion and extraction electric potential relative to Li metal.

In the invention, the difference between the Li insertion and extraction electric potential relative to Li metal of the cathode active material and the Li insertion and extraction electric potential relative to Li metal of the anode active material is preferably in the range of 3.4 V to 3.7 V, and more preferably in the range of 3.5 V to 3.7 V. This is because the battery according to the invention can be applied without a change of design to devices currently commonly used (devices equipped with a battery having a battery voltage of 3.6 V).

Herein, a battery voltage can be defined by the difference in Li insertion and extraction electric potential between a cathode active material and an anode active material. The Li insertion and extraction electric potential of conventionally-used $LiCoO_2$ (cathode active material) relative to Li metal is about 3.9 V and the Li insertion and extraction electric potential of a conventionally-used carbon material (anode active material) relative to Li metal is about 0.3 V, and therefore a difference of about 3.6 V between them is the battery voltage of a conventional lithium battery. $LiCoO_2$ is widely used in common lithium batteries, and therefore portable devices such as mobile phones, game machines, laptop computers are often designed on the assumption that a battery having a battery voltage of about 3.6 V is used. Meanwhile, Co contained in $LiCoO_2$ is a rare metal, and therefore it is necessary to consider the replacement of $LiCoO_2$ with a Mn-containing active material in which Mn is used as a base to reduce the use amount of Co.

However, a battery using a Mn-containing active material instead of $LiCoO_2$ currently commonly used may not have a battery voltage of about 3.6 V even when a conventional anode active material such as a carbon material or LTO is used. In this case, there is a problem that the design of devices using such a battery needs to be changed. On the other hand, a battery having a battery voltage of 3.4 V to 3.7 V can be easily obtained by using the above-described active material for a battery in which the M element is Y (yttrium) (for example, an active material having a Li insertion and extraction electric potential of 1.1 V to 1.2 V) as the anode active material and the above-described Mn-containing active material (for example, an active material having a Li insertion and extraction electric potential of 4.6 V to 4.8 V) as the cathode active material. This is advantageous in that it is not necessary to change the design of conventional devices. Further, with the use of such a Mn-containing active material as the cathode active material, the use amount of Co that is a rare metal can be reduced.

The shape of the cathode active material is preferably particulate. The average particle diameter of the cathode active material is in the range of, for example, 1 nm to 100 μm, and preferably in the range of 10 nm to 30 μm. The amount of the cathode active material contained in the cathode active material layer is preferably as large as possible from the viewpoint of capacity, for example, in the range of 60% by weight to 99% by weight, and preferably in the range of 70% by weight to 95% by weight. It is to be noted that types of the conducting material, the binding agent, and the solid electrolyte material used in the cathode active material layer and the amounts of them contained in the cathode active material layer are the same as those described above with reference to the anode active material layer, and therefore a description thereof will not be repeated. The thickness of the cathode active material layer widely varies depending on the structure of the battery, but is preferably in the range of, for example, 0.1 μm to 1000 μm.

3. Electrolyte Layer

Herein below, the electrolyte layer used in the invention will be described. The electrolyte layer used in the invention is a layer formed between the cathode active material layer and the anode active material layer. The electrolyte layer contains an electrolyte that allows ion conduction between the cathode active material and the anode active material. The form of the electrolyte layer is not particularly limited, and examples of the electrolyte layer include a liquid electrolyte layer, a gel electrolyte layer, and a solid electrolyte layer.

A liquid electrolyte layer is usually formed using a nonaqueous electrolyte liquid. The type of nonaqueous electrolyte liquid varies depending on the type of battery. For example, a nonaqueous electrolyte liquid used in lithium batteries usually contains a lithium salt and a nonaqueous solvent. Examples of the lithium salt include: inorganic lithium salts such as $LiPF_6$, $LiBF_4$, $LiClO_4$, and $LiAsF_6$; organic lithium salts such as $LiCF_3SO_3$, $LiN(CF_3SO_2)_2$, $LiN(C_2F_5SO_2)_2$, and $LiC(CF_3SO_2)_3$. Examples of the nonaqueous solvent include ethylene carbonate (EC), propylene carbonate (PC), dimethyl carbonate (DMC), diethyl carbonate (DEC), ethyl methyl carbonate (EMC), butylene carbonate (BC), γ-butyrolactone, sulfolane, acetonitrile, 1,2-dimethoxymethane, 1,3-dimethoxypropane, diethyl ether, tetrahydrofuran, 2-methyl tetrahydrofuran, and mixtures of them. The concentration of the lithium salt in the nonaqueous electrolyte liquid is in the range of, for example, 0.5 mol/L to 3 mol/L. It is to be noted that the nonaqueous electrolyte liquid used in the invention may be a low-volatile liquid such as an ionic liquid.

A gel electrolyte layer can be obtained by, for example, adding a polymer to a nonaqueous electrolyte liquid to turn it into a gel. Specifically, a nonaqueous electrolyte liquid can be turned into a gel by adding a polymer such as polyethylene oxide (PEO), polyacrylonitrile (PAN), or polymethyl methacrylate (PMMA) thereto.

A solid electrolyte layer is a layer formed using a solid electrolyte material. Examples of the solid electrolyte material include oxide solid electrolyte materials and sulfide solid electrolyte materials. For example, when the battery according to the invention is a lithium battery, the solid electrolyte material is preferably a sulfide solid electrolyte material. This is because a high-output battery having a high Li ion conductivity can be obtained. Examples of a sulfide solid electrolyte material having Li ion conductivity include solid electrolyte materials containing Li, S, and a third component A. The third component A is, for example, at least one selected from the group consisting of P, Ge, B, Si, I, Al, Ga, and As. Among them, the sulfide solid electrolyte material used in the invention is preferably a compound using $Li_2S$ and a sulfide MS other than $Li_2S$. Specific examples of such a compound include an $Li_2S$—$P_2S_5$ compound, an $Li_2S$—$SiS_2$ compound, and an $Li_2S$—$GeS_2$ compound. Among them, an $Li_2S$—$P_2S_5$ compound is preferred due to its high Li ion conductivity. When a molar ratio between $Li_2S$ and the sulfide MS is defined as $xLi_2S$—$(100-x)$ MS, "x" satisfies preferably the relation $50 \leq x \leq 95$, and more preferably the relation $60 \leq x \leq 85$.

It is to be noted that $Li_2S$—$P_2S_5$ compound refers to a sulfide solid electrolyte material using $Li_2S$ and $P_2S_5$. The same applies for the other compounds. For example, an amorphous $Li_2S$—$P_2S_5$ compound can be obtained by mechanical milling or melt quenching using $Li_2S$ and $P_2S_5$.

The solid electrolyte material used in the invention may be amorphous or crystalline. A crystalline sulfide solid electrolyte material can be obtained by, for example, calcining an amorphous sulfide solid electrolyte material. For example, crystalline $Li_7P_3S_{11}$ having a high Li ion conductivity can be obtained by calcining an amorphous sulfide solid electrolyte material having a composition of $70Li_2S$-$30P_2S_5$. The shape of the solid electrolyte material is preferably particulate. The average particle diameter of the solid electrolyte material is in the range of, for example, 1 nm to 100 μm, and preferably in the range of 10 nm to 30 μm.

The thickness of the electrolyte layer widely varies depending on the type of electrolyte used and the structure of the battery, but is in the range of, for example, 0.1 μm to 1000 μm, and preferably in the range of 0.1 μm to 300 μm.

4. Other Components

The battery according to the invention comprises at least the above-described anode active material layer, cathode active material layer, and electrolyte layer. Usually, the battery according to the invention further comprises a cathode current collector that collects current from the cathode active material layer and an anode current collector that collects current from the anode active material layer. Examples of the material of the cathode current collector include SUS, aluminum, nickel, iron, titanium, and carbon. Among them, SUS is preferred. Meanwhile, examples of the material of the anode current collector include SUS, copper, nickel, and carbon. Among them, SUS is preferred. It is preferable that the thickness, shape or the like of each of the cathode current collector and the anode current collector are appropriately selected depending on factors such as the intended use of the battery.

The battery according to the invention may comprise a separator between the cathode active material layer and the anode active material layer. This is because a battery having a higher level of safety can be obtained. Examples of the material of the separator include porous membranes made of polyethylene, polypropylene, cellulose, or polyvinylidene fluoride and non-woven fabrics such as resin non-woven fabrics and glass fiber non-woven fabrics. The battery case used in the invention may be one used for common batteries. An example of such a battery case is one made of SUS.

5. Battery

The battery according to the invention is not particularly limited as long as it comprises the above-described cathode active material layer, anode active material layer, and electrolyte layer. Examples of the battery according to the invention include a lithium battery, a sodium battery, a magnesium battery, and a calcium battery. Among them, a lithium battery and a sodium battery are preferred, and a lithium battery is particularly preferred. Further, the battery according to the invention may be one whose electrolyte layer is a solid electrolyte layer or one whose electrolyte layer is a liquid electrolyte layer. Further, the battery according to the invention may be a primary battery or a secondary battery, but is preferably a secondary battery. This is because a secondary battery can undergo repeated charge and discharge, and is therefore useful as, for example, a vehicle-mounted battery. Further, the battery according to the invention may be, for example, a coin type battery, a laminate type battery, a cylinder type battery, or a rectangular type battery. A method for producing the battery is not particularly limited, and is the same as a common method for producing a battery.

It is to be noted that the invention is not limited to the above embodiments. The above embodiments are mere examples, and those having substantially the same structure as technical ideas described in the claims of the invention and providing the same functions and effects are included in the technical scope of the invention.

EXAMPLES

Herein below, the present invention will be described more specifically with reference to the following examples.

Example 1

First, $Y_2O_3$, $TiO_2$, and $TiS_2$ (all manufactured by Sigma-Aldrich Co. LLC.) were prepared as a raw material. Then, equimolar amounts of $Y_2O_3$, $TiO_2$, and $TiS_2$ were weighed and mixed using a mortar and pestle to give a raw material composition. Then, the obtained raw material composition was put in a quartz tube and sealed after the inside of the glass tube was made vacuum. Next, the quartz tube was heated at 1100° C. for 5 days using a calcination furnace. After cooling, the resulting materials were pulverized using a mortar and pestle to adjust the particle diameter. Accordingly, the active material for a battery of the invention was obtained.

[Evaluation 1]
(1) X Ray Diffraction Measurement

Figure 2:
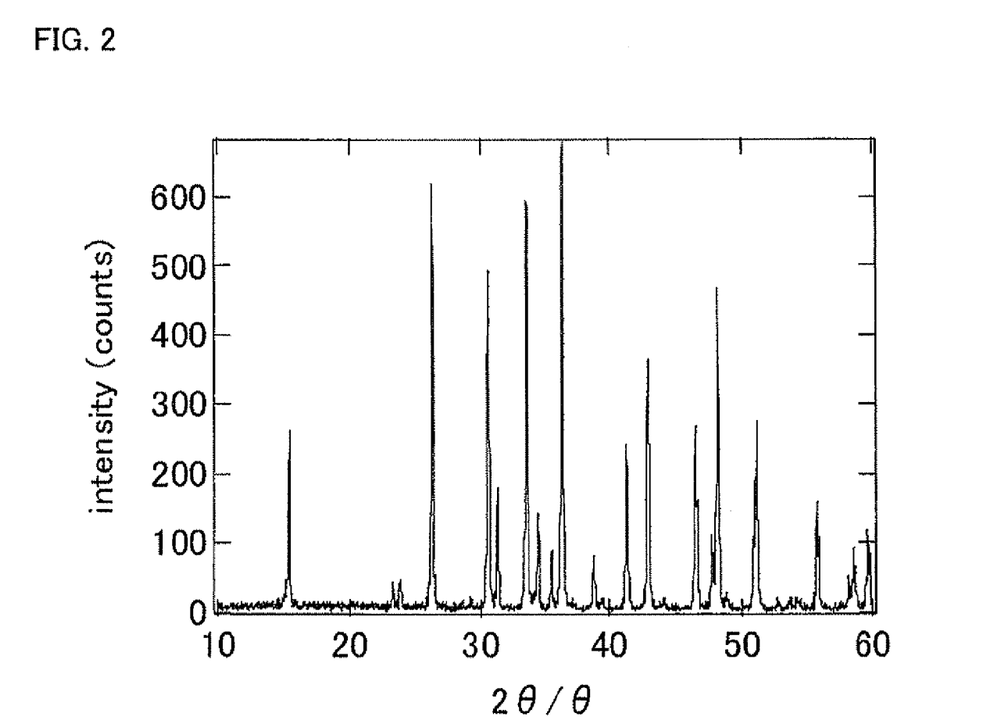
FIG. 2 illustrates a result of measuring the active material obtained from the Example 1 by X ray diffraction.

The X ray diffraction (XRD) measurement of the active material which has been obtained from the Example 1 was carried out. The results are given in FIG. 2. From the chart of FIG. 2, it was confirmed that the active material obtained contains a crystalline phase of $Y_2Ti_2O_5S_2$. The peaks representing the crystalline phase of $Y_2Ti_2O_5S_2$ were observed at $2\theta=15.6°, 26.2°, 31.3°, 33.6°, 36.4°, 41.3°, 43.0°$, and $48.2°$.

(2) Charge and Discharge Characteristics
(First Evaluation Battery)

The active material obtained in Example 1 was used as a cathode active material to produce a battery for evaluation, and the charge and discharge characteristics of the active material were evaluated. First, the cathode active material, polytetrafluoroethylene (PTFE), which is a binding agent, and Ketjen Black (KB), which is a conducting material, were prepared. And then, the cathode active material, PTFE, and KB were mixed with each other at a ratio of cathode active material: PTFE:KB=70:5:25 (weight ratio) to obtain the cathode composite material (10 mg). Next, as a liquid electrolyte, a solution in which $LiPF_6$ is dissolved at a concentration of 1 mol/L in a solvent obtained by mixing ethylene carbonate (EC) and diethyl carbonate (DEC) at a volume ratio of 1:1 was prepared and Li metal was prepared as an anode active material. By using these components, a coin type battery for evaluation was produced.

Figure 3:
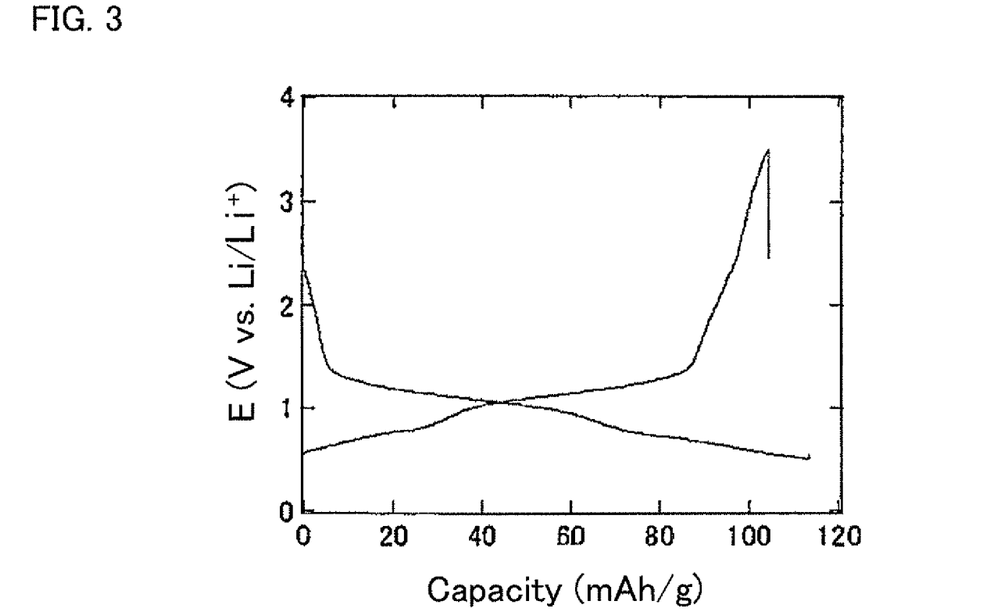
FIG. 3 illustrates a result of evaluating the charge and discharge characteristics of the first battery for evaluation.

Thereafter, the thus obtained battery for evaluation was subjected to charge and discharge at constant current (0.2 mA) in a charge and discharge range of 0.5 V to 3.5 V. The charge and discharge was started from discharge. The results are illustrated in FIG. 3. As illustrated in FIG. 3, a reversible reaction occurred in the battery in the range of about 0.9 V to 1.1 V. As a result, it has been confirmed that the Li insertion and extraction electric potential of the active material relative to Li metal is 1.4 V or less. Further, it is considered that the behavior of the battery for evaluation at 0.7 V or less shown by the charge and discharge curve is influenced by KB used as a conducting material. From this, in consideration of the influence of KB, it is estimated that the capacity of the active material is about 70 mAh/g.

(Second Evaluation Battery)

A battery for evaluation was produced using Li$(Ni_{0.25}Mn_{0.75})_2O_4$ as a cathode active material to evaluate the charge and discharge properties of the active material. Here, the evaluation battery was a coin type battery produced in the same manner as described above except that Li$(Ni_{0.25}Mn_{0.75})_2O_4$ is used instead of the active material obtained in the Example 1.

Figure 4:
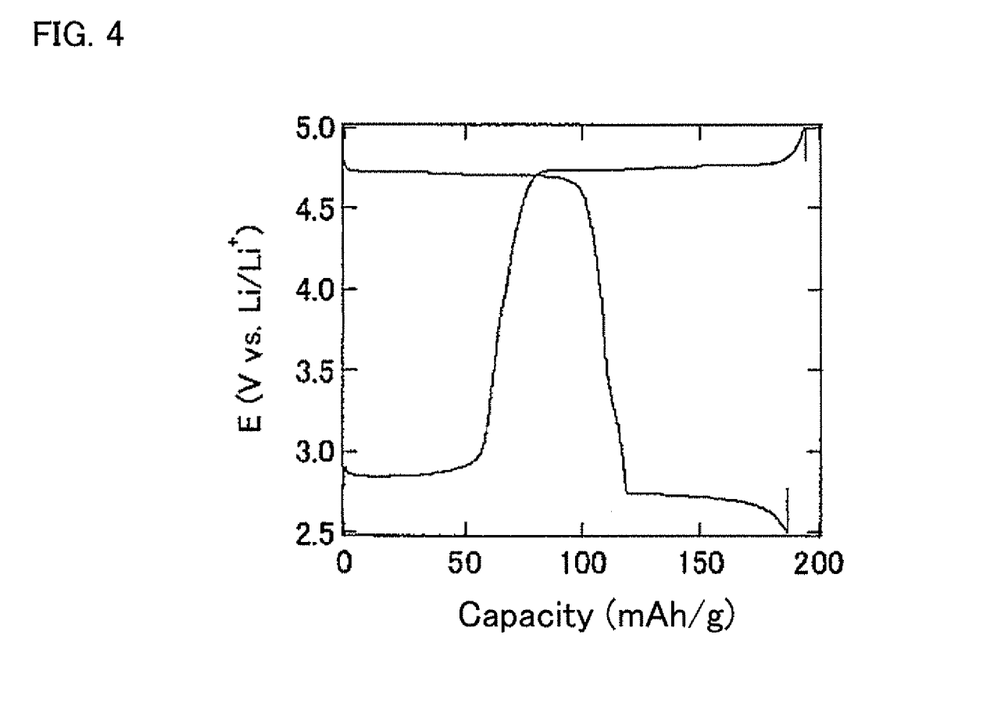
FIG. 4 illustrates a result of evaluating the charge and discharge characteristics of the second battery for evaluation.

Thereafter, the thus obtained evaluation battery was subjected to charge and discharge at a constant current (0.2 mA) in a charge and discharge range of 2.5 V to 5.0 V. The charge and discharge was started from charge. The results are illustrated in FIG. 4. As illustrated in FIG. 4, a reversible reaction occurred in the battery in the range of about 4.6 V to 4.8 V. From this, it has been confirmed that the Li insertion and extraction electric potential of the active material relative to Li metal is in the range of 4.6 V to 4.8 V. It is to be noted that in FIG. 4, the reversible reaction occurred in the battery is observed also in the range of 2.6 V to 2.9 V. Herein, however, the higher electric potential is defined as the Li insertion and extraction electric potential of the active material relative to Li metal.

(Third Evaluation Battery)

A battery for evaluation was produced using the active material obtained in the Example 1 as an anode active material and Li$(Ni_{0.25}Mn_{0.75})_2O_4$ as a cathode active material. First, the cathode active material, PTFE, and KB were mixed with each other at a ratio of cathode active material: PTFE:KB=70:5: 25 (weight ratio) to obtain a cathode composite material (10 mg). Then, the anode active material, PTFE, and KB were mixed with each other at a ratio of anode active material: PTFE:KB=70:5:25 (weight ratio) to obtain an anode composite material (10 mg). Then, as a liquid electrolyte, a solution in which $LiPF_6$ is dissolved at a concentration of 1 mol/L in a solvent obtained by mixing ethylene carbonate (EC) and diethyl carbonate (DEC) at a volume ratio of 1:1 was prepared. By using these components, a coin type battery for evaluation was produced.

Thereafter, the thus obtained evaluation battery was subjected to charge and discharge at a constant current (0.2 mA). The charge and discharge was started from charge. As a result, it has been confirmed that the main charge reaction of the evaluation battery occurs in the range of about 3.5 V to 3.7 V and the main discharge reaction of the evaluation battery occurs in the range of about 3.4 V to 3.7 V. Then, the evaluation battery was subjected to ten charge and discharge cycles under the same conditions as described above. The results of the cycle efficiency of 1st cycle and the 10th cycle are illustrated in Table 1. As illustrated in Table 1, it has been confirmed that the battery according to the present invention has excellent cycle efficiencies.

TABLE 1

|  | Discharge capacity (mAh/g) | Charge capacity (mAh/g) | Coulombic efficiency (Charge/Discharge) | Cycle efficiency |
|---|---|---|---|---|
| 1st cycle | 113 | 107 | 1.05 | — |
| 10th cycle | 110 | 105 | 1.05 | 98% |

(3) Cyclic Voltammetry Measurement

With the first evaluation battery using the active material obtained in the Example 1, cyclic voltammetry (CV) was measured to calculate its Li insertion and extraction electric potential of the active material relative to Li metal. The measurement was performed using an electrochemical measuring system (trade name: Model 147055BEC, manufactured by Solartron) in a electric potential range of 0.5 V to 4.0 V (vs Li/Li$^+$) at a sweep rate of 0.1 mV/sec. As a result, the insertion electric potential was 0.96 V (vs Li/Li$^+$), the extraction electric potential was 1.23 V (vs Li/Li$^+$), and the Li insertion and extraction electric potential was 1.095 V (vs Li/Li$^+$).

Example 2

First, $Nd_2O_3$, $TiO_2$, and $TiS_2$ (all manufactured by Sigma-Aldrich Co. LLC.) were prepared as a raw material. Then, equimolar amounts of $Nd_2O_3$, $TiO_2$, and $TiS_2$ were weighed and mixed using a mortar and pestle to obtain a raw material composition. Then, the obtained raw material composition was put in a quartz tube and sealed after the inside of the glass tube was made vacuum. Next, the quartz tube was heated at 1100° C. for 4 days using a calcination furnace. After cooling, the resulting materials were pulverized using a mortar and pestle to adjust the particle diameter. Accordingly, the active material for a battery of the invention was obtained.

[Evaluation 2]
(1) X Ray Diffraction Measurement

Figure 5:
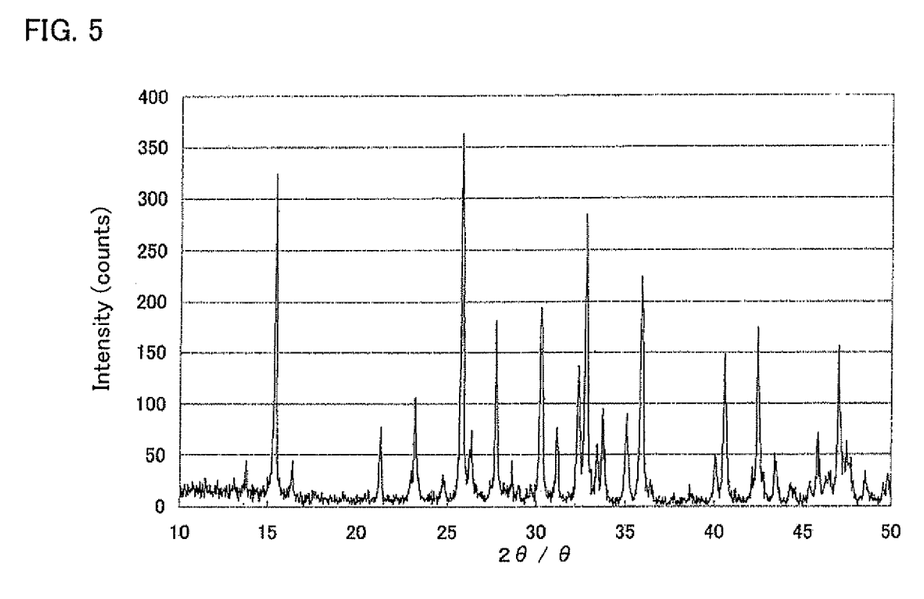
FIG. 5 illustrates a result of measuring the active material obtained from the Example 2 by X ray diffraction.

The X ray diffraction (XRD) measurement of the active material which has been obtained from the Example 2 was carried out. The results are given in FIG. 5. From the chart of FIG. 5, it was confirmed that the active material obtained contains a crystalline phase of $Nd_2Ti_2O_5S_2$. The peaks representing the crystalline phase of $Nd_2Ti_2O_5S_2$ were observed at 2θ=15.4°, 25.8°, 30.3°, 32.8°, 35.9°, 40.6°, 42.4°, and 47.0°.

(2) Charge and Discharge Characteristics

The active material obtained in Example 2 was used as a cathode active material to produce a battery for evaluation, and the charge and discharge characteristics of the active material were evaluated. First, the cathode active material, polytetrafluoroethylene (PTFE), which is a binding agent, and Ketjen Black (KB), which is a conducting material, were prepared. Thereafter, the cathode active material, PTFE, and KB were mixed with each other at a ratio of cathode active material: PTFE:KB=70:5:25 (weight ratio) to give the cathode composite material (10 mg). Next, as a liquid electrolyte, a solution in which $LiPF_6$ is dissolved at a concentration of 1 mol/L in a solvent obtained by mixing ethylene carbonate (EC) and diethyl carbonate (DEC) at a volume ratio of 1:1 was prepared and Li metal was prepared as an anode active material. By using these components, a coin type battery for evaluation was produced.

Figure 6:
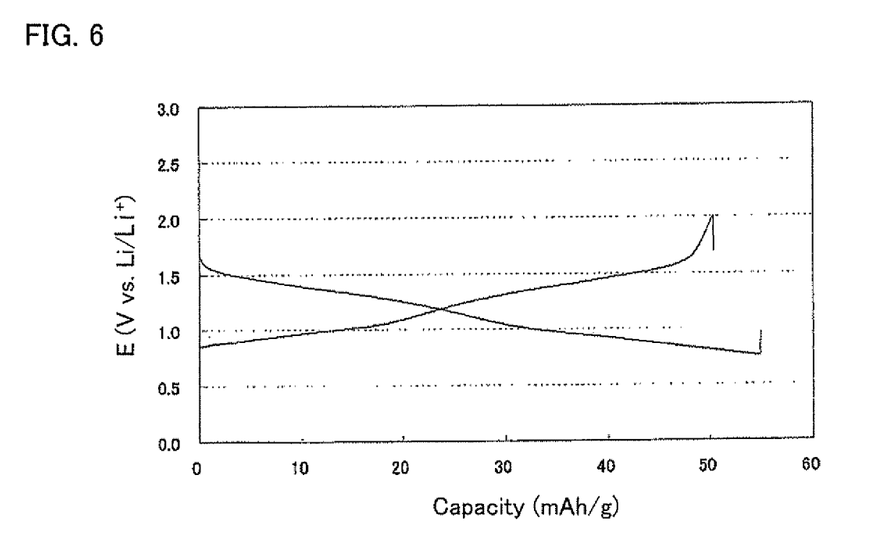
FIG. 6 illustrates a result of evaluating the charge and discharge characteristics of the battery for evaluation in which the active material obtained from the Example 2 is used.

Thereafter, the thus obtained battery for evaluation was subjected to charge and discharge at constant current (0.2 mA) in a charge and discharge range of 0.75 V to 2.0 V. The charge and discharge was started from discharge. The results are illustrated in FIG. 6. As illustrated in FIG. 6, a reversible reaction occurred in the battery in the range of about 1.1 V to 1.4 V. From this, it has been confirmed that the Li insertion and extraction electric potential of the active material relative to Li metal is 1.4 V or less.

(3) Cyclic Voltammetry Measurement

Figure 7:
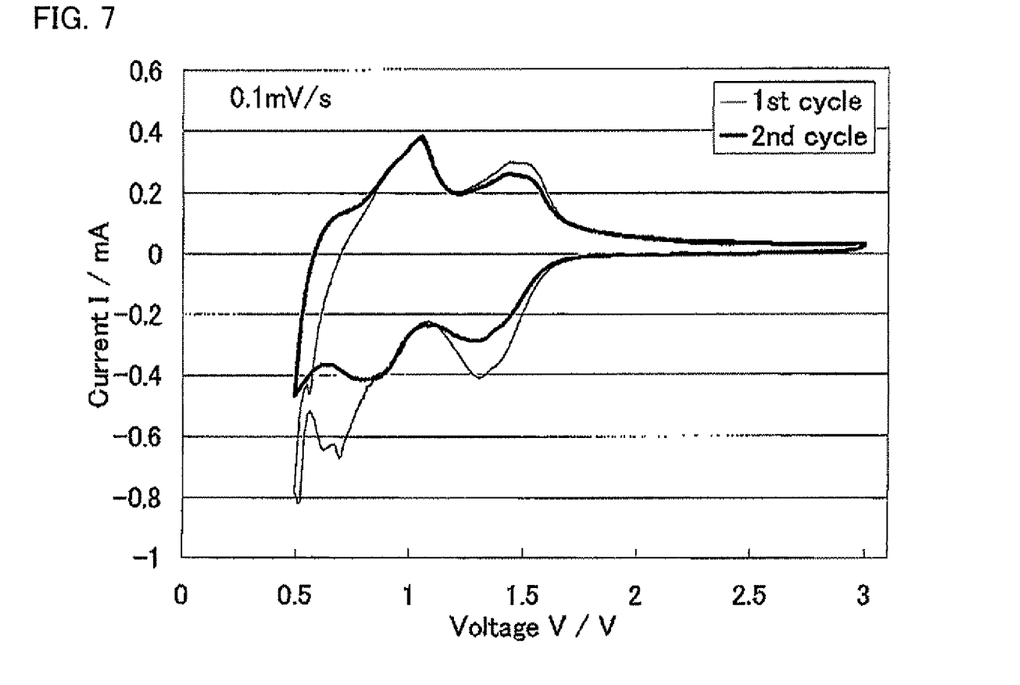
FIG. 7 illustrates a result of CV measurement of the battery for evaluation in which the active material obtained from the Example 2 is used.

A battery for evaluation was obtained in the same manner as the above-described first evaluation battery except that the active material obtained in Example 2 is used. Thereafter, cyclic voltammetry (CV) measurement was carried out for the resulting battery for evaluation to calculate its Li insertion and extraction electric potential of the active material relative to Li metal. The measurement was performed using an electrochemical measuring system (trade name: Model 147055BEC, manufactured by Solartron) in an electric potential range of 0.5 V to 3.0 V (vs Li/Li$^+$) at a sweep rate of 0.1 mV/sec. The results are illustrated in FIG. 7. As illustrated in FIG. 7, capacity due to the active material was confirmed about 1.1 V to 1.4 V. The capacity due to the active material was also confirmed near 0.9 V. Further, since the oxidation peak and reduction peak were shown simultaneously, the reversible reaction of Li insertion and extraction was indicated.

REFERENCE SIGNS LIST

1 . . . Cathode active material layer
2 . . . Anode active material layer
3 . . . Electrolyte layer
4 . . . Cathode current collector
5 . . . Anode current collector
6 . . . Battery case
10 . . . Battery

The invention claimed is:

1. A secondary battery comprising a cathode active material layer containing a cathode active material, an anode active material layer containing an anode active material, and an electrolyte layer formed between the cathode active material layer and the anode active material layer,
wherein
the cathode active material or the anode active material is a first active material comprising a M element in Group III, a Ti element, an O element, and a S element and comprising an $M_2Ti_2O_5S_2$ crystalline phase with a proportion of 50 mol % or higher, and
a Li insertion and extraction electric potential of the first active material relative to Li metal is 1.4 V or less.

2. The secondary battery according to claim 1, wherein the M element of the first active material is at least one of Y and Nd.

3. The secondary battery according to claim 1, wherein the anode active material is the first active material.

4. The secondary battery according to claim 3, wherein the M element of the first active material is Y (yttrium) and the cathode active material is an active material which has a Li insertion and extraction electric potential relative to Li metal in the range of 4.6 V to 4.8 V.

5. The secondary battery according to claim 3, wherein a difference between a Li insertion and extraction electric potential relative to Li metal of the cathode active material and a Li insertion and extraction electric potential relative to Li metal of the anode active material is within the range of 3.4 V to 3.7 V.

6. The secondary battery according to claim 1, wherein the secondary battery is a lithium secondary battery.

7. The secondary battery according to claim 1, wherein the M element of the first active material is Nd.

8. A secondary battery comprising a cathode active material layer containing a cathode active material, an anode active material layer containing an anode active material, and an electrolyte layer foamed between the cathode active material layer and the anode active material layer,
wherein the cathode active material or the anode active material is a second active material comprising a M element in Group III, a Ti element, an O element, and a S element, being crystalline, and a Li insertion and extraction electric potential of the second active material relative to Li metal is 1.4 V or less.

9. The secondary battery according to claim 8, wherein the second active material has a crystalline phase, with a proportion of 50 mol % or higher, having a structure in which a part of the M element, that is present at site A of Ruddlesden-Popper structure $A_3B_2C_7$, is defective.

10. The secondary battery according to claim 8, wherein the M element of the second active material is at least one of Y and Nd.

11. The secondary battery according to claim 8, wherein the anode active material is the second active material.

12. The secondary battery according to claim 11, wherein the M element of the second active material is Y (yttrium) and the cathode active material is an active material which has a Li insertion and extraction electric potential relative to Li metal in the range of 4.6 V to 4.8 V.

13. The secondary battery according to claim 11, wherein a difference between a Li insertion and extraction electric potential relative to Li metal of the cathode active material and a Li insertion and extraction electric potential relative to Li metal of the anode active material is within the range of 3.4 V to 3.7 V.

14. The secondary battery according to claim 8, wherein the secondary battery is a lithium secondary battery.

15. The secondary battery according to claim 8, wherein the M element of the second active material is Nd.

* * * * *